(12) United States Patent
Greither

(10) Patent No.: US 8,062,688 B2
(45) Date of Patent: Nov. 22, 2011

(54) NUTRITIONAL FOOD OIL COMPOSITIONS AND METHODS OF MAKING SAME

(76) Inventor: Thomas Greither, Burnaby (CA)

( * ) Notice: Subject to any disclaimer, the term of this patent is extended or adjusted under 35 U.S.C. 154(b) by 1193 days.

(21) Appl. No.: 11/675,009

(22) Filed: Feb. 14, 2007

(65) Prior Publication Data

US 2008/0280009 A1 Nov. 13, 2008

(51) Int. Cl.
*A23D 9/00* (2006.01)

(52) U.S. Cl. .................. 426/601; 424/195.17; 424/764; 424/766; 424/768; 424/776

(58) Field of Classification Search .................. 426/601; 554/1; 424/757, 764, 766, 768, 776, 780, 424/195.17, 439
See application file for complete search history.

(56) References Cited

U.S. PATENT DOCUMENTS

| | | | | |
|---|---|---|---|---|
| 5,518,753 | A * | 5/1996 | Bracco et al. .................. | 426/601 |
| 6,506,412 | B2 * | 1/2003 | Troyer et al. .................. | 424/523 |
| 7,045,143 | B1 * | 5/2006 | Sawatzki et al. .............. | 424/439 |
| 7,740,885 | B2 * | 6/2010 | Predal ........................... | 424/725 |
| 2002/0077362 | A1 * | 6/2002 | Lee et al. ...................... | 514/560 |
| 2004/0076695 | A1 * | 4/2004 | Gilbard ......................... | 424/765 |
| 2004/0082656 | A1 * | 4/2004 | Lee et al. ...................... | 514/560 |
| 2006/0111254 | A1 * | 5/2006 | Makadia et al. .............. | 508/459 |
| 2007/0010480 | A1 * | 1/2007 | Rusing et al. ................. | 514/54 |
| 2007/0166411 | A1 * | 7/2007 | Anthony et al. .............. | 424/750 |
| 2008/0069942 | A1 * | 3/2008 | Pizzey .......................... | 426/601 |
| 2010/0144878 | A1 * | 6/2010 | Popp ............................. | 514/560 |

FOREIGN PATENT DOCUMENTS

WO WO2007/005725 * 6/2006

OTHER PUBLICATIONS

Anon. 1982, The American Heritage Dictionary, $2^{nd}$ edition. Houghton Mifflin Co., Boston, MA, p. 734.*
Hui, Y. 1996. Baileys Industiral Oil and Fat Products, 5th edition, vol. 1, John Wiley & Sons., Inc. New York, p. 444-445.*

* cited by examiner

*Primary Examiner* — Carolyn Paden

(57) ABSTRACT

Nutritional food oil compositions containing all of the essential fatty acids and the highly recommended omega-3 fatty acid DHA in correct proportions making it convenient and easy for consumers to supplement their diets with these fatty acids in the proper amounts, thereby deriving the health benefits of these fatty acids. A nutritional food oil composition is provided comprising alpha-linolenic acid (ALA) and linoleic acid (LA), wherein the ratio of the amount of ALA to LA in the composition by weight is in the range of 1.5:1 to 6:1, and together the ALA and LA comprise at least 65% by weight of the composition, and docahexaenoic acid (DHA) from an algal source in an amount greater than 0.5% by weight of the composition.

8 Claims, 1 Drawing Sheet

NUTRITIONAL FOOD OIL COMPOSITIONS AND METHODS OF MAKING SAME

BACKGROUND OF THE INVENTION

The present invention relates generally to nutritional food formulations. More particularly, the invention is directed to nutritional food oil compositions containing essential fatty acids that are important for maintaining good health.

Diet is important in determining general health, performance, energy level and appearance. A healthy diet must include proper amounts of essential nutrients, which are nutrients that are incapable of being synthesized by the body and therefore, must be obtained from the diet. Essential nutrients are different for different animals. Of the approximately forty essential nutrients necessary for humans, fourteen are minerals, fourteen are vitamins, ten are amino acids and two are essential fatty acids.

The two essential fatty acids are: linoleic acid (LA), an omega-6 fatty acid; and alpha-linolenic acid (ALA), an omega-3 fatty acid. Linoleic acid is a precursor for the omega-6 series of polyunsaturated fatty acids; from LA, gamma-linolenic acid (GLA) and arachidonic acids can be formed in the body. Alpha-linolenic acid is a precursor for the omega-3 series of polyunsaturated fatty acids; eicosapentaenoic acid (EPA) and docosahexaenoic acid (DHA) are metabolites of ALA that have recently received much acclaim in the public and scientific communities for their health benefits.

Omega-3 fatty acids are linked to a wide variety of beneficial health effects in documented studies and are essential constituents of cells, especially brain cells, nerve cells, retina, adrenal glands, and reproductive cells. Long chain omega-3 polyunsaturated fatty acids such as DHA and EPA are thought to have health benefits for the heart, skin, immune system, and they help regulate inflammatory diseases, attention deficit disorders and infant development. Some studies suggest benefits in preventing Alzheimer's, dementia, and colorectal cancers.

Over the last 150 years, the level of consumption of omega-3 fatty acids (also referred to as n-3) has decreased to one-sixth the level found in our food supply in the 1850s. In comparison, the level of omega-6 fatty acid (also referred to as n-6) consumption has doubled in that time, drastically changing the ratio of omega-6 to omega-3 fatty acid in our food intake. In the 1930s, the ratio of dietary n-6:n-3 fatty acids was about 8:1, and in 1980's that ratio increased to 12:1. In today's North American diets, polyunsaturated fatty acids contribute approximately 7% of total energy intake and approximately 19-22% of energy intake from fats. These levels are within recommended intakes for both men and women. Linoleic acid (LA; n-6) contributes about 84-89% of total energy from polyunsaturated fatty acids, but only about 9-11% of total polyunsaturated fatty acids energy is derived from ALA (n-3). The highly unsaturated fatty acids—EPA and DHA together—provide less or equal to 0.1-0.2% of energy intake. While the cells in our bodies require both n-3 and n-6 fatty acids, the typical North American diet obtains too much n-6 and far too little n-3.

Further exacerbation of the problem is that most North Americans obtain their n-6 fatty acids from cooking oils, which are derived from seed oils but which have been extensively processed with chemicals and at high temperatures in order to extend the shelf life of the oils. The result is that many beneficial substances found in the natural seed oils, including ALA and LA, are removed or damaged by commercial processing methods. For example, it is common in the food oil industry to treat the seed oils with sodium hydroxide and hydrochloric acid, bleach the oils using clays to remove color pigments, and to deodorize the oils by heating to temperatures over 200° C. As a result, phytosterols, lecithin, and antioxidants are removed from the oil, and a significant number of the fatty acid molecules are damaged or transformed into toxic molecules such as trans-fats. ALA is particularly susceptible to being damaged by excessive heat. The heavy use of these refined cooking oils in North American diets is attributed to increased risk of cancer, inflammation and cardiovascular disease, and other negative health consequences.

Recognizing the imbalance of the ratio of dietary n-6:n-3 in the average North American diet, health professionals recommend increasing the amounts of n-3 fatty acids in one's diet. Certain grains and fish are the predominant sources of the n-3 fatty acid ALA. Of the grains, flax has the highest amount of ALA (about 60%) but it is low in the n-6 fatty acid LA (about 15%). Oils of fatty fish contain approximately 30% of n-6 fatty acids as LA and approximately 30% n-3 fatty acids in the form of EPA and DHA. However, there exists a significant risk of contamination of these oils by heavy metals and other toxic substances, as has been reported in the health industry recently.

In contrast to fish oils, flaxseed oil from organic sources and when properly extracted is free of contaminants. However, the principle disadvantage to flaxseed oil as a source of omega-3 fatty acids is that if it is taken as the only source of dietary essential fatty acids, it will lead to omega-6 fatty acid deficiency and the body will exhibit the classic symptoms such as dry eyes, irregular heartbeats, joint pain and thin, papery skin. Therefore, it is important that the ratio of n-6:n-3 fatty acid intake in the diet be maintained within certain limits.

The body is able to convert ALA to the other n-3 fatty acids EPA and DHA, but the conversion of ALA to these other highly unsaturated fatty acids may be somewhat inefficient, and some health professionals have recently recommended augmenting dietary fatty acid intake directly with EPA and particularly with DHA. The prior art teaches that to appreciably boost DHA intake, it will be necessary to increase fish oil consumption since fish oils are the predominant source of this fatty acid.

Of the highly unsaturated fatty acids, DHA is a vital component of the phospholipids of human cellular membranes, especially those in the brain and retina. It is necessary for optimal neural development and visual acuity. Supplemental DHA may have anti-inflammatory and immune-modulating activities. DHA might also be indicated for nursing mothers and women who are pregnant, for individuals with peroxisomal disorders, for individuals with cystic fibrosis, for those with attention deficit disorder, dyslexia, and those individuals with cognitive impairment and dementia (including Alzheimer's disease). Dietary DHA can reduce the level of blood triglycerides, which may reduce the risk of heart disease. Low levels of DHA cause reduction of brain serotonin levels and have been associated with ADHD, Alzheimer's disease, and depression, among other diseases, and there is mounting evidence that DHA supplementation may be effective in combating such diseases With the numerous recommendations by health professionals to increase omega-3 fatty acid intake, to decrease omega-6 fatty acid intake, to supplement omega-3 fatty acid directly with DHA, and the risk of contamination of fatty fish and fish oils with heavy metals and other toxic substances, consumers are likely to be confused as to which fatty acids to consume, in what amounts, and from what sources. Contributing to the confusion are the multiple sources of nutritional food oils in the market place that contain only one form of essential fatty acid or another. Consumers must obtain their dietary fatty acids from multiple sources, which necessitates that they carefully calculate the appropriate dose amounts of the various fatty acid supplements in order to obtain the essential fatty acids in the correct proportions. Accordingly, there is need for a dietary fatty acid oil supplement that contains all of the essential fatty acids and the recommended omega-3 fatty acids in the correct proportions, from sources free of contamination, so that health conscious consumers are able to obtain all of their dietary essential fatty acids from one convenient source.

SUMMARY OF THE INVENTION

In one aspect, the present invention provides nutritional food oil compositions that contain all of the essential fatty acids and the recommended omega-3 fatty acid DHA in correct proportions so that it becomes convenient and easy for consumers to supplement their diets with these fatty acids in the proper amounts, thereby deriving the health benefits of these fatty acids.

Accordingly, in some embodiments, the present invention provides a nutritional food oil composition comprising alpha-linolenic acid (ALA) from an unprocessed seed oil source and linoleic acid (LA) from an unprocessed seed oil source, wherein the ratio of the amount of ALA to the amount of LA in the composition by weight is in the range of 1.5:1 to 6:1, and together the ALA and LA comprise at least 65% by weight of the composition, and docahexaenoic acid (DHA) in an amount greater than 0.5% by weight of the composition. The DHA is preferably from an algal source. In some embodiments, the ratio of the amount of ALA to the amount of LA in the composition by weight may be in the range of 1.5:1 to 3:1. The amount of DHA may be in the range of 0.5%-2.0% by weight of the composition. In some embodiments, the ratio of the amount of ALA to the amount of LA in the composition by weight is in the range of 1.8:1 to 2.8:1, or it may by 2:1. In some embodiments, the amount of DHA is in the range of 0.7%-1.0% by weight of the composition.

There is further provided a nutritional food oil composition comprising unprocessed flaxseed oil in an amount in the range of 65%-75% by weight of the composition, one or more unprocessed seed oils selected from the group consisting of sunflower oil, grape seed oil, sesame oil, pumpkin seed oil, macadamia nut oil, almond oil, and olive oil in an amount in the range of 25%-35% by weight of the composition, and an algal source of docahexaenoic acid (DHA) in an amount greater than 0.5% by weight of the composition. The amount of DHA may be in the range of 0.5%-2.0% by weight of the composition. In some embodiments, the unprocessed seed oil comprises unprocessed sunflower oil in an amount in the range of 10-15% by weight of the composition, and unprocessed sesame oil in an amount in the range of 4-8% by weight of the composition. Some embodiments may further include a source of gamma-linolenic acid (GLA) in an amount in the range of 3%-5% of the composition by weight. A source of medium chain triglycerides may also be included an amount in the range of 1%-2% of the composition by weight. Some embodiments may further include a source of tocotrienols in an amount less than 1% of the composition by weight. Soy lecithin may also be included in an amount less than 1% of the composition by weight.

There is further provided a nutritional food oil composition comprising flaxseed oil in an amount in the range of 70%-75% by weight of the composition, sunflower oil in an amount in the range of 10%-15% by weight of the composition, sesame oil in an amount in the range of 4%-8% by weight of the composition, docahexaenoic acid from an algal source in the range of 0.5%-1.2% by weight of the composition, rice germ and bran oil in an amount less than 1.5% by weight of the composition, coconut oil in an amount in the range of 1%-2% by weight of the composition, evening primrose oil in an amount in the range of 1%-2% by weight of the composition, soy lecithin in an amount less than 1% by weight of the composition, and rosemary extract in an amount less than 0.2% by weight of the composition.

In another aspect, the present invention provides a method of extracting nutrient rich, unprocessed seed oil such that the oil remains close to its natural state. When used herein in reference to seed oils, the term "unprocessed" shall mean that the oil has not been treated with chemicals or heat in excess of 60° C. such that the oil is not chemically altered from its original or natural state, but rather has undergone physical separation steps to extract the oil from the seed source. This ensures the finest quality oils are produced for food whereby the oils retain a rich flavor and color that is true to their natural state, and the phytochemicals and essential fatty acids in the oils are preserved.

Accordingly, in some embodiments, the present invention provides a method of producing unprocessed seed oil comprising setting the temperature of the head in a cold auger type vegetable oil press to between 29° C. to 46° C., providing an oxygen free environment in the press chamber, loading an amount of seeds into the press chamber and slowly and evenly pressing the seeds to produce a crude oil, decanting the crude oil in a centrifuge decanter to remove larger solids from the crude oil to produce a first intermediate oil, centrifuging the oil in a vertical super centrifuge to further remove suspended solids from the crude oil to produce a second intermediate oil, filtering the intermediate oil through a frame filter press clarifier having a series of incrementally finer filter media, starting with 250 micron filter media at the fluid inlet to 50 micron filter media towards the fluid, to remove suspended solids larger than 50 microns to produce an unprocessed finished seed oil, cooling the finished oil to a temperature in the range of about 4° C.-10° C., and collecting the finished seed oil and storing said oil in a dark, oxygen free environment, and at a temperature in the range of about 4° C.-10° C., wherein the seed oil is at all times maintained in a oxygen free environment. The oxygen free environment may be provided by flooding the various pieces of equipment and piping through which the seed oil passes with nitrogen gas.

There is further provided a method of producing a nutritional food oil composition comprising the steps of obtaining an amount of the finished flaxseed oil produced in accordance with the above method and mixing amounts of oils into the flaxseed oil wherein the oils are selected from the group consisting of sunflower oil, sesame oil, rice germ and bran oil, coconut oil, and evening primrose oil, mixing amounts of other constituents into the flaxseed oil wherein the other constituents are selected from the group consisting of docahexaenoic extract from an algal source, soy lecithin and rosemary extract, wherein the amounts of the components of composition are present in the following percentage amounts by weight: flaxseed oil: 70%-75%; sunflower oil: 10%-15%; sesame oil: 4%-8%; docahexaenoic acid: 0.5%-1.2%; rice germ and bran oil: less than 1.5%; coconut oil: 1%-2%; evening primrose oil: 1%-2%; soy lecithin: less than 1%; and rosemary extract in an amount less than 0.2.

BRIEF DESCRIPTION OF THE DRAWINGS

These and other features of the invention will become more apparent from the following description in which reference is made to the appended drawings wherein.

DETAILED DESCRIPTION

Figure 1:
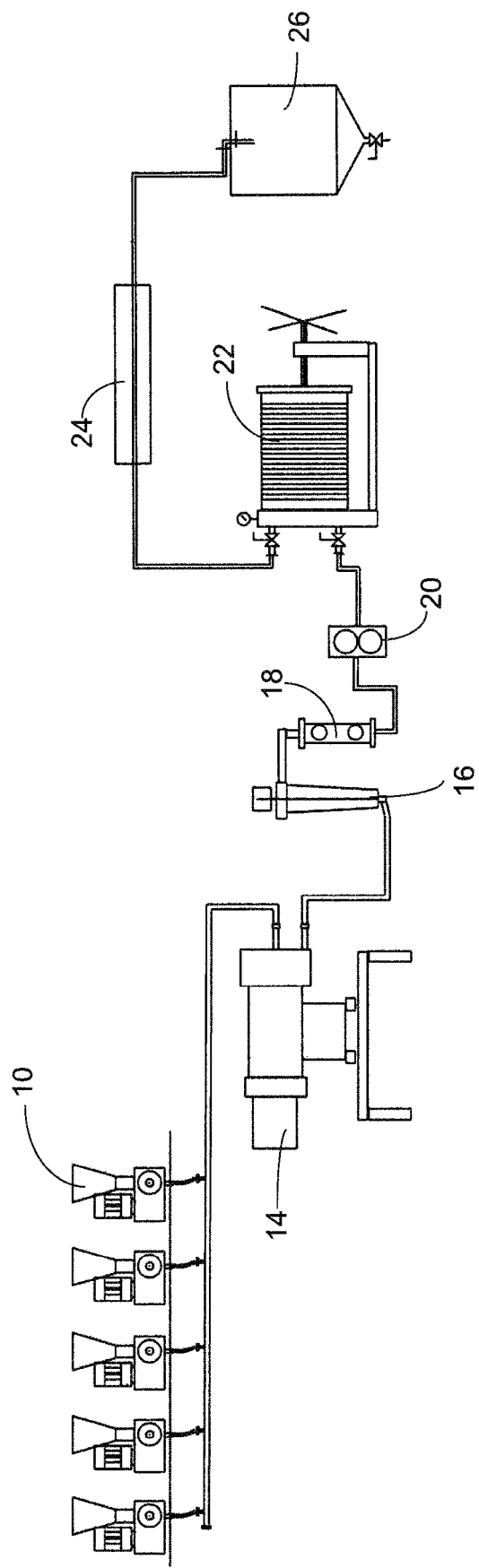
FIG. 1 is a schematic of a method of producing unprocessed seed oils of the present invention.

The present invention describes nutritional food oil compositions containing proportioned amounts of omega-3 and omega-6 fatty acids and methods for preparing the compositions. Preparation of the compositions using the methods of the invention minimizes chemical changes in chemically reactive molecules, particularly in the unsaturated carbon-carbon double bonds of hydrocarbon chains in fatty acids of plant constituents.

The present invention provides a nutritional food oil composition that includes the omega-3 fatty acid alpha-linolenic acid (ALA) and the omega-6 fatty acid linoleic acid (LA), both being derived from seed oil sources and preferably from seeds grown organically, and the highly unsaturated fatty acid docahexaenoic acid (DHA) preferably being derived from an algal source. The ALA and LA comprise at least 65% of the composition by weight and the ratio of the amount of ALA to the amount of LA by weight may be in the range of 1.5:1 to 6:1, and the DHA is present in the composition in an amount greater than 0.5% by weight of the composition.

In some embodiments, the ratio of the amount of ALA to the amount of LA in the composition by weight may be 1.6:1, 1.7:1, 1.8:1, 2:1, 2.2:1, 2.4:1, 2.6:1, 2.8:1 or 2.9:1 or any ratio in between 1.6:1 and 2.9:1.

In some embodiments, the amount of DHA in the composition by weight of the composition may be in an amount from a minimum of 0.5%, 0.6%, 0.7%, 0.8%, 0.9%, 1.0%, or 1.2% to a maximum of 0.9%, 1.0%, 1.2%, 1.4%, 1.6%, 1.8% or 2.0%, wherein a range may, for example, be selected from any of the foregoing minimum values in combination with any of the foregoing maximum values, or any value lesser than, greater than or in between, for example, 0.7% to 1.8%, or 0.7% to 1.4%, or about 0.9%.

The present invention provides nutritional food oil compositions that have the two essential fatty acids, omega-3 ALA and omega-6 LA in preferable relative amounts so that the body obtains both of them per given volume of the composition without resulting in a deficiency in one or the other. In addition, the highly unsaturated omega-3 fatty acid DHA is present in an amount that has been linked to a number of important health benefits.

More preferably, the ratio of the amount of ALA to the of LA in the composition by weight is in the range of 1.8:1 to 2.8:1, and in some embodiments the ration is 2:1. Preferably, the amount of DHA is in the range of 0.5-2.0% by weight of the composition, and in some embodiments it is in the range of 0.7-0.9% by weight of the composition.

In some embodiments, the omega-3 fatty acid ALA is present in the form of unprocessed flaxseed oil that is obtained in accordance with the methods described herein. The primary consideration with respect to the flaxseed oil is that it be as close to its natural state as possible, which requires that the flaxseed oil not processed using chemicals or high heat, and that it be maintained in an oxygen free environment throughout the extraction steps as described herein.

Flaxseed oil is a preferred source of ALA since it has one of the highest ALA contents of any of the plant sources of ALA. Flaxseed oil comprises of approximately 60% ALA, approximately 15% LA and approximately 19% of the omega-9 fatty acid (non-essential) oleic acid. Other preferred sources of ALA may be unprocessed canola oil or unprocessed chia seed oil, both of which also have a high ALA content. Plant sources of ALA are preferred over fish oil sources because of the risk of toxic contaminants being present in the fish oils.

Since the ratio of LA:ALA in flaxseed oil may be inadequate (approximately 1:4) for optimal health, the LA in the nutritional food oil composition is increased to a more balanced ratio. The additional omega-6 fatty acid LA may be present in the form of one or more seed oils selected from sunflower oil, grape seed oil, sesame oil, almond oil, pumpkin seed oil, macadamia nut oil, or olive oil. Preferably, these would also be from organic sources and be unprocessed; in other words, be extracted using techniques that do not use chemicals or high heat so that the fatty acid molecules and the phytochemicals in the oils are not damaged. The aforementioned oils comprise almost solely of LA and have little or no ALA in them. Thus, these seed oil sources of LA are preferably over other seed oil sources that have varying amounts of both LA and ALA (such as soy, walnut, hemp, mustard and canola) because it is easier to formulate a composition with the right ratios of LA:ALA when using seed oils comprising of mostly LA to adjust the LA:ALA ratio of the composition.

Preferably, the DHA is from a non-animal source, and preferably from an algal source such as a DHA extract that is produced by Martek Biosciences Corporation of Columbia, Md., USA, and sold under the trademark life'sDHA™. The life'sDHA™ DHA extract is available as a DHA concentrate, usually in the range of 30%-40% DHA.

In some embodiments, the nutritional food oil composition of present invention comprises:

unprocessed flaxseed oil in an amount from a minimum of about: 65%, 66%, 67%, 68%, 69% or 70% to a maximum of about 70%, 71%, 72%, 73%, 74% or 75%, wherein a range may, for example, be selected from any of the foregoing minimum values in combination with any of the foregoing maximum values, or any value lesser than, greater than or in between, for example, 67% to 72%, or 65% to 70%, or about 70% by weight of the composition;

one or more unprocessed seed oils selected from the group consisting of sunflower oil, grape seed oil, sesame oil, almond oil, pumpkin seed oil, macadamia nut oil, and olive oil in an amount from a minimum of about: 25%, 26%, 27%, 28%, 29% or 30% to a maximum of about 30%, 31%, 32%, 33%, 34% or 35%, wherein a range may, for example, be selected from any of the foregoing minimum values in combination with any of the foregoing maximum values, or any value lesser than, greater than or in between, for example, 27% to 30%, or 27% to 32%, or about 30% by weight of the composition by weight of the composition; and an algal source of docahexaenoic acid in an amount from a minimum of 0.5%, 0.6%, 0.7%, 0.8%, 0.9%, 1.0%, or 1.2% to a maximum of 0.9%, 1.0%, 1.2%, 1.4%, 1.6%, 1.8% or 2.0%, wherein a range may, for example, be selected from any of the foregoing minimum values in combination with any of the foregoing maximum values, or any value lesser than, greater than or in between, for example, 0.7% to 1.8%, or 0.7% to 1.4%, or about 0.9% by weight of the composition.

In some embodiments, the unprocessed seed oils are sunflower oil in an amount in the range of 10-15% by weight of the composition, and sesame oil in an amount in the range of 4-8% by weight of the composition. Some embodiments of the composition may include a source of the omega-6 fatty acid gamma-linolenic acid (GLA), such as evening primrose oil in an amount in the range of 1%-2% by weight of the composition. GLA is believed to have anti-inflammatory and antithrombotic actions, and it also improves the conversion of ALA to EPA and DHA in the body.

Coconut oil may also be included in an amount in the range of 1%-2% by weight as a source of medium chain triglycerides (MCTs), which can improve liver function and fat absorption. Lecithin, such as from a soy source, may be included in an amount less than 1%, and preferably about 0.3%. Lecithin assists with emulsification, digestion and absorption of fatty acids in the body.

One or more source of tocotrienols (belonging to the vitamin E family) such as rice germ and bran oil and/or oat germ and bran oil may be included in amounts less than 1.5% by weight of the composition. Tocotrienols are effective in stabilizing the oils in the composition as well as having antioxidant activity.

In regards to all of the plant sources of oils or extracts, it is highly preferable that the sources be organically grown and from non-genetically modified (non-GMO) stock to minimize or eliminate the risk of contamination of the ingredients by toxic chemicals, such as heavy metals, pesticides, and the like.

An exemplary formulation of a nutritional food oil composition of present invention on a commercially feasible scale is shown in Table 1:

TABLE 1

| Ingredients | Quantity (kg) Per batch size: 1300 kg | Percentage (%) |
|---|---|---|
| Oil mix (organic sources) consisting of the following as a percentage by weight of the oil mix:<br>Flax oil: 77.66%<br>Sunflower oil: 14.77%<br>Sesame oil: 6.53%<br>Rice germ and bran oil: 1.03%<br>Oat germ and bran oil: 0.01% | 1184.3-1193.7 kg | 91.1-91.8 |
| Coconut oil, organic | 20.8 kg | 1.6 |
| Evening Primrose oil, organic | 52.0 kg | 4.0 |
| Soy lecithin (non-GMO) | 3.9 kg | 0.3 |
| life'sDHA ™ DHA extract: 30%-40% concentrate | 28.3-37.7 kg | 2.17-2.9* |
| Rosemary extract | 1.3 kg | 0.1 |

*The content of the DHA in the concentrate may range from 30%-40%. The amount must be adjusted according to the actual DHA content in the concentrate in order to meet a target of approximately 120 mg DHA per tablespoon of the oil composition. The following formula may be used: % DHA concentrate to use (w/w) = 86.956 ÷ the actual % of the DHA in the concentrate The present invention also provides methods of producing a nutritional food oil composition. The desired unprocessed seed oils must be obtained in a manner that does not damage the fatty acid molecules in the oil and preserves the phytochemicals and other natural constituents therein. To achieve this objective, the seeds are pressed, decanted and filtered under closely controlled temperatures and under an oxygen-deprived environment, such as in a nitrogen environment. An oxygen-deprived environment is achieved by shrouding the oil with nitrogen gas—i.e. by flooding all cavities in the machinery or piping in which the oil may be exposed to air with nitrogen gas to displace any air in the cavity.

Referring to FIG. 1, a cold auger vegetable oil press 10, such as a KOMET™ vegetable oil press, model KT11066, manufactured by IBG Monforts Oekotec GmbH & Co. of Mönchengladbach, Germany, is used to extract crude oil from the seeds. Depending on the batch size, more than one press may be used simultaneously as illustrated. Firstly, using head warmers, the head in the press is set to a temperature in the range of 29-46° C. and the press chamber is flooded with nitrogen gas to provide an environment for the crude oil that is free of oxygen. Also, the crude oil outlets of the press are shrouded with nitrogen gas to eliminate oxygen and moisture getting into the oil. An amount of seeds is metered into the press, and the press is operated slowly and evenly to avoid generating excessive amounts of heat to avoid damaging the ALA within the oil. ALA is particularly sensitive to excess heat. The crude seed oil from the press is piped to a decanter 14 where the larger suspended solids are extracted from the crude seed oil. The decanter may be of the centrifuge kind such as a Flottweg model Z23 Hygienic Design Decanter Centrifuge manufactured by Flottweg GmbH & Co. of Vilsbiburg, Germany. Advantageously, the centrifuge decanter enables a continuous flow of the crude seed oil to be decanted, as opposed to prior art methods whereby the major solid separation from the oil is accomplished by settling the crude oil in settling tanks for a period of 4-7 days. It should be noted that the space in the decanter is also flooded with nitrogen. From the liquid outlet of the decanter, an intermediate seed oil, which has had the major solids removed but which still contains smaller suspended solids, is piped into a continuous flow vertical centrifuge 16, such as a Sharples model AS16 Super Centrifuge, in which the oil is subjected to a gravitational force of about 13,000 times that of gravity to further remove suspended solids that were not removed in the decanter. From the centrifuge, the intermediate oil is piped through a balance tube 18 and pumped by rotary pump 20 into a frame filter press clarifier 22, such as a model EUS400 Plate and Frame Filter Press, manufactured by ErtelAlsop of Kingston, N.Y., USA, in which the remaining suspended solids larger than 50 microns are removed. The frame filter clarifier has a series of filter plates with filter media approximately 250 microns at the fluid inlet, and progressively finer filter media towards the fluid outlet, with the last filter media being approximately 50 microns. Accordingly, progressively smaller suspended solids are removed from the intermediate seed oil as it passes through the frame filter press, until only particles smaller than 50 microns remain in the oil. After clarification, the oil flowing from the outlet of the clarifier is finished seed oil. The clarification steps are also carried out under a nitrogen environment in order to prevent oxidation of the seed oil. The finished seed oil is piped into a heat exchanger 24 where the temperature of the oil is cooled to between 4° C.-10° C. Thereafter, the finished seed oil may be stored in a nitrogen flooded tank 26 at a temperature between 4° C.-10° C. until it is required for blending with other oils and/or components to produce a nutritional food oil composition of the present invention. In general, the seed oil is maintained under a nitrogen environment during all steps of the extraction method where the oil would be otherwise exposed to air.

The above-described method may be used to produce the unprocessed seed oils for use in formulating the oil compositions of the present invention. Alternatively, rather than individually extracting each of the seed oils that are to be used in a particular composition, an amount of pre-mixed seeds in appropriate proportions may be pressed together and the resultant crude oil composition may be clarified using the above described method to yield a finished unprocessed seed oil blend to which other constituents may be added as required to produce a nutritional food oil composition of the present invention. Thus, for example, a seed blend containing flax seeds in an amount in the range of 80%-86%, sunflower seeds in an amount in the range of 8%-10%, sesame seeds in an amount in the range of 4%-5%, rice bran in an amount in the range of 2%-3%, and oat bran in an amount in the range of 0%-1%, by dry weight of the seed blend, may be pressed in the vegetable press 10 and clarified in accordance with the above method to yield a clarified oil blend, having desirable proportions of ALA and LA, to which an algal source of DHA may be added to produce an embodiment of a nutritional food oil composition of the present invention.

In some embodiments, the dry seed blend may comprise:

flax seeds in an amount from a minimum of about: 80%, 81%, 82%, 83%, 84% or 85% to a maximum of about 81%, 82%, 83%, 84%, 85% or 86%, wherein a range may, for example, be selected from any of the foregoing minimum values in combination with any of the foregoing maximum values, or any value lesser than, greater than or in between, for example, 80% to 85%, or 82% to 84%, or about 83% by dry weight of the blend;

sunflower seeds in an amount from a minimum of about: 8%, 9% or 10% to a maximum of about 8%, 9%, or 10%, wherein a range may, for example, be selected from any of the foregoing minimum values in combination with any of the foregoing maximum values, or any value lesser than, greater than or in between, for example, 8% to 10%, or 8.5% to 9.5%, or about 9% by dry weight of the blend;

sesame seeds in an amount from a minimum of about: 4%, 4.4% or 4.8% to a maximum of about 4.4%, 4.8%, or 5%, wherein a range may, for example, be selected from any of the foregoing minimum values in combination with any of the foregoing maximum values, or any value lesser than, greater than or in between, for example, 4% to 5%, or 4.4% to 4.8%, or about 4.5% by dry weight of the blend;

rice bran in an amount from a minimum of about: 2%, 2.4% or 2.8% to a maximum of about 2.4%, 2.8%, or 3%, wherein a range may, for example, be selected from any of the foregoing minimum values in combination with any of the foregoing maximum values, or any value lesser than, greater than or in between, for example, 2% to 3%, or 2.4% to 2.8%, or about 2.5% by dry weight of the blend; and oat bran in an amount from a minimum of about: 0%, 0.4% or 0.8% to a maximum of about 0.4%, 0.8% or 1%, wherein a range may, for example, be selected from any of the foregoing minimum values in combination with any of the foregoing maximum values, or any value lesser than, greater than or in between, for example, 0% to 1%, or 0.4% to 0.8%, or about 0.5% by dry weight of the blend.

While this document describes what are at present to be the preferred embodiments of the invention, it will be clear to those skilled in the art that various changes and modifications may be made without departing from the invention. The invention is to be determined solely in terms of the following claims.

What is claimed is:

1. A nutritional food oil composition comprising:
   unprocessed flaxseed oil in an amount in the range of 65%-75% by weight of the composition;
   one or more unprocessed seed oils selected from the group consisting of sunflower oil, grape seed oil, sesame oil, pumpkin seed oil, macadamia nut oil, almond oil, and olive oil in an amount in the range of 25%-35% by weight of the composition; and
   an algal source of docahexaenoic acid (DHA) in an amount greater than 0.5% by weight of the composition.

2. The composition of claim 1 wherein the amount of DHA is in the range of 0.5%-2.0% by weight of the composition.

3. The composition of claim 2 wherein the unprocessed seed oil comprises:
   unprocessed sunflower oil in an amount in the range of 10-15% by weight of the composition; and
   unprocessed sesame oil in an amount in the range of 4-8% by weight of the composition.

4. The composition of claim 3 further including a source of gamma-linolenic acid (GLA) in an amount in the range of 1%-2% of the composition by weight.

5. The composition of claim 4 further including a source of medium chain triglycerides an amount in the range of 1%-2% of the composition by weight.

6. The composition of claim 5 further including a source of tocotrienols in an amount less than 1.5% of the composition by weight.

7. The composition of claim 6 further including a soy lecithin in an amount less than 1% of the composition by weight.

8. A nutritional food oil composition comprising:
   flaxseed oil in an amount in the range of 70%-75% by weight of the composition;
   sunflower oil in an amount in the range of 10%-15% by weight of the composition;
   sesame oil in an amount in the range of 4%-8% by weight of the composition;
   docahexaenoic acid from an algal source in the range of 0.5%-1.2% by weight of the composition;
   rice germ and bran oil in an amount less than 1.5% by weight of the composition;
   coconut oil in an amount in the range of 1%-2% by weight of the composition;
   evening primrose oil in an amount in the range of 1%-2% by weight of the composition;
   soy lecithin in an amount less than 1% by weight of the composition; and
   rosemary extract in an amount less than 0.2% by weight of the composition.

\* \* \* \* \*